(12) United States Patent
Tucker et al.

(10) Patent No.: US 7,125,497 B1
(45) Date of Patent: *Oct. 24, 2006

(54) REACTIVE FORMULATIONS FOR A NEUTRALIZATION OF TOXIC INDUSTRIAL CHEMICALS

(75) Inventors: Mark D. Tucker, Albuqueruqe, NM (US); Rita G. Betty, Rio Rancho, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/850,802

(22) Filed: May 21, 2004

Related U.S. Application Data (60) Provisional application No. 60/472,770, filed on May 22, 2003.

(51) Int. Cl.
*A62D 3/00* (2006.01)
*C01B 17/42* (2006.01)
*C01B 17/62* (2006.01)
*C02F 1/70* (2006.01)

(52) U.S. Cl. .............. 252/188.21; 252/188.2; 252/186.38; 252/186.39; 252/186.41; 588/319; 588/318; 588/401; 588/402; 588/901; 510/110; 510/370

(58) Field of Classification Search .......... 588/200, 588/218, 901, 319, 318, 401, 402; 252/186.38, 252/186.39, 186.41, 188.2, 188.21, 188.22, 252/188.23; 510/110, 370; 516/15
See application file for complete search history.

(56) References Cited

U.S. PATENT DOCUMENTS

| | | | | |
|---|---|---|---|---|
| 3,901,819 | A * | 8/1975 | Nakagawa et al. | 252/186.4 |
| 4,536,314 | A * | 8/1985 | Hardy et al. | 510/376 |
| 4,657,925 | A * | 4/1987 | Horn | 514/438 |
| 4,853,143 | A * | 8/1989 | Hardy et al. | 510/312 |
| 5,438,060 | A * | 8/1995 | Miyazaki et al. | 514/262.1 |
| 5,889,030 | A * | 3/1999 | Doi et al. | 514/350 |
| 6,239,113 | B1 * | 5/2001 | Dawson et al. | 514/29 |
| 6,245,957 | B1 * | 6/2001 | Wagner et al. | 588/316 |
| 6,448,062 | B1 * | 9/2002 | Huth et al. | 435/264 |
| 6,534,668 | B1 * | 3/2003 | Backer et al. | 556/427 |
| 6,559,189 | B1 * | 5/2003 | Baker et al. | 514/642 |
| 6,566,574 | B1 * | 5/2003 | Tàdros et al. | 252/186.41 |
| 6,723,890 | B1 * | 4/2004 | Tucker et al. | 588/318 |
| 6,919,348 | B1 * | 7/2005 | Wei | 514/269 |
| 2001/0012859 | A1 * | 8/2001 | Higashiyama et al. | 514/560 |
| 2003/0158459 | A1 * | 8/2003 | Tucker | 588/200 |

FOREIGN PATENT DOCUMENTS

WO WO 02/02192 A1 * 1/2002

* cited by examiner

*Primary Examiner*—Joseph D. Anthony
(74) *Attorney, Agent, or Firm*—Robert D. Watson (57) ABSTRACT

Decontamination formulations for neutralization of toxic industrial chemicals, and methods of making and using same. The formulations are effective for neutralizing malathion, hydrogen cyanide, sodium cyanide, butyl isocyanate, carbon disulfide, phosgene gas, capsaicin in commercial pepper spray, chlorine gas, anhydrous ammonia gas; and may be effective at neutralizing hydrogen sulfide, sulfur dioxide, formaldehyde, ethylene oxide, methyl bromide, boron trichloride, fluorine, tetraethyl pyrophosphate, phosphorous trichloride, arsine, and tungsten hexafluoride.

15 Claims, 1 Drawing Sheet

REACTIVE FORMULATIONS FOR A NEUTRALIZATION OF TOXIC INDUSTRIAL CHEMICALS

CROSS-REFERENCE TO RELATED APPLICATIONS

This application claims the benefit of the filing of U.S. Provisional Patent Application Ser. No. 60/472,770 filed on May 22, 2003, and the specification thereof is incorporated herein by reference.

GOVERNMENT RIGHTS

The Government has rights to this invention pursuant to Contract No. DE-AC04-94AL85000 awarded by the U.S. Department of Energy.

BACKGROUND OF THE INVENTION

The present invention relates to decontamination formulations for neutralization of toxic industrial chemicals, and methods of making and using same.

Recent attention has focused on responding to terrorist events involving Chemical and Biological Warfare (CBW) agents. Our recent work on the development of DF-100 and DF-200 Sandia decontamination technologies (e.g., U.S. Pat. Nos. 6,566,574 and 6,273,890, which are herein incorporated by reference) has successfully addressed biological toxins (e.g., Ricin and botulism), biological pathogens (e.g., anthrax and plague) and chemical warfare agents that have been traditionally developed for military use (e.g., Sarin, VX, and Mustard). However, a more likely scenario would be for terrorists to steal readily available toxic industrial chemicals (TICs) such as anhydrous ammonia, phosgene, hydrogen cyanide, and chlorine gas for use as chemical agents. This avoids difficulties such as producing highly toxic chemical warfare agents in a safe manner, the acquisition of pre-cursors for chemical agents that are closely monitored, and the direct handling of the agents during dissemination. In fact, the FBI considers and the direct handling of the agents during dissemination. In fact, the FBI considers the use of TICs by terrorists to be more likely than the use of the traditional military-type CBW agents.

Rapid decontamination of toxic industrial chemicals (TICs), in both the liquid and gaseous phases, presents a considerable technical challenge because not all TICs are the same and therefore represent a set of chemicals that have vastly different properties. Some TICs, for example, are highly water-soluble (e.g., sulfur dioxide); while others are only sparingly soluble (e.g., malathion). Others must be neutralized by chemical oxidation (e.g., sulfur dioxide) or nucleophilic attack (e.g., malathion). Still others must be neutralized by chemical reduction (e.g., chlorine).

Development of a broad decontamination technology enhances the USA's ability for dealing with the top six terrorist WMD threats identified by the FBI. In order, these are: biological toxins, TICs, biological pathogens, radionuclides, chemical warfare agents, and nuclear weapons. The technology will have broad market appeal beyond anti-terrorism efforts since it could also be routinely used for non-terrorist events, such as accidental HazMat spills and releases, etc.

Against this background, the present invention was developed.

BRIEF DESCRIPTION OF THE DRAWINGS

The accompanying drawings, which are incorporated in and form part of the specification, illustrate various examples of the present invention and, together with the description, serve to explain the principles of the invention.

SUMMARY OF THE INVENTION

The present invention relates to decontamination formulations for neutralization of toxic industrial chemicals, and methods of making and using same. The formulations are effective for neutralizing malathion, hydrogen cyanide, sodium cyanide, butyl isocyanate, carbon disulfide, phosgene gas, capsaicin in commercial pepper spray, chlorine gas, anhydrous ammonia gas; and may be effective at neutralizing hydrogen sulfide, sulfur dioxide, formaldehyde, ethylene oxide, methyl bromide, boron trichloride, fluorine, tetraethyl pyrophosphate, phosphorous trichloride, arsine, and tungsten hexafluoride.

DETAILED DESCRIPTION OF THE INVENTION

The present invention addresses the need for a set of closely-related formulations that neutralize the adverse effects of toxic industrial chemicals (TICs), where a TIC is defined as any chemical compound, constituent, substance, species, or agent that through its chemical action on life processes can, if left untreated, cause death, temporary incapacitation, acute and chronic health effects, or permanent harm to humans or animals. This includes all such chemicals agents, regardless of their origin or of their method of production, and regardless of whether they are produced in facilities, in munitions, or elsewhere. Neutralization is defined as the mitigation, de-toxification, decontamination, or otherwise destruction of TICs to the extent that the TICs no longer cause adverse health effects to humans or animals. The present invention addresses the need for decontamination formulations that are non-toxic, non-corrosive, lost-cost, long shelf-life, and that can be delivered by a variety of means and in different phases, including sprays, foams, fogs, mists, aerosols, gels, creams, pastes, baths, strippable coatings, etc.

The word "formulation" is defined herein as the made-up, "activated" product or solution (e.g., aqueous decontamination solution) that can be applied to a surface or body, or dispersed into the air, etc. for the purpose of neutralization, with or without the addition of a gas (e.g., air) to create foam. Unless otherwise specifically stated, the concentrations, constituents, or components listed herein are relative to the weight percentage of the made-up, activated aqueous decontamination solution. The word "water" is defined herein to broadly include: pure water, tap water, well water, waste water, deionized water, demineralized water, saltwater, or any other liquid consisting substantially of $H_2O$.

Figure 1:
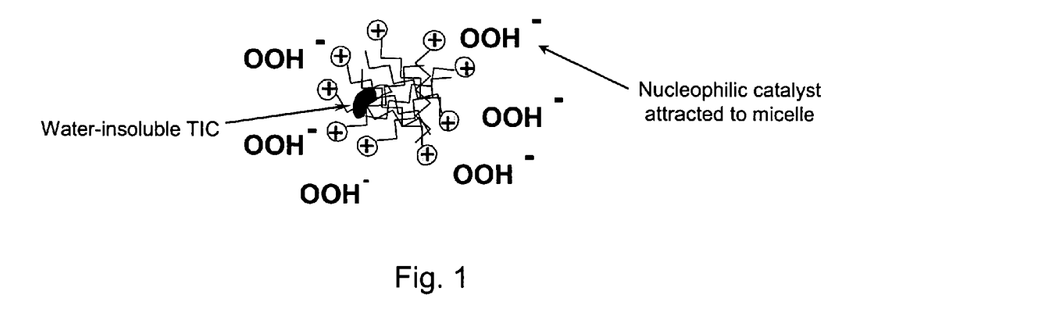
FIG. 1 illustrates nucleophillic attack of a water-insoluble TIC within a cationic micelle that is formed from cationic surfactants.

A primary mechanism for detoxification of TICs in the present invention involves the principle of micellar catalysis. This principle is illustrated for a TIC that is insoluble in water that may be detoxified by nucleophilic attack. A set of constituents has been selected to provide a mechanism to solubilize the sparingly soluble TIC agents and to attract a reactive catalyst, dissolved in aqueous media, to a position in close proximity to the TIC molecule vulnerable to nucleophilic attack. This is accomplished through the recognition that certain nucleophiles are negatively charged. Therefore, the formulation contains cationic surfactants that form positively charged micelles to solubilize the TIC and attract the negatively charged nucleophile such as hydroxyl ions ($OH^-$) and hydroperoxide ions ($OOH^-$). This principle can also being applied to insoluble TICs which are subject to an oxidative attack by a negatively-charged oxidizer such as hydroperoxycarbonate ($HCO_4^-$) and to insoluble TICs that are subject to a reductive attack by negatively-charged reductants, such as sodium bisulfite ($HSO_3^-$) or sodium thiosulfate ($S_2O_3^{2-}$).

FIG. 1 illustrates nucleophillic attack of a water-insoluble TIC within a cationic micelle that is formed from cationic surfactants. In an aqueous environment, the insoluble TIC is dissolved within the micelle comprised of an aggregate of surfactant molecules with hydrophobic tails forming the interior core of the micelle, and hydrophilic heads concentrating at the surface of the micelle. These positively charged hydrophilic heads attract the negatively charged nucleophiles (in this case, the $OOH^-$ ion), thereby greatly enhancing the reaction rates with the insoluble TIC within the micelle.

Figure 2:
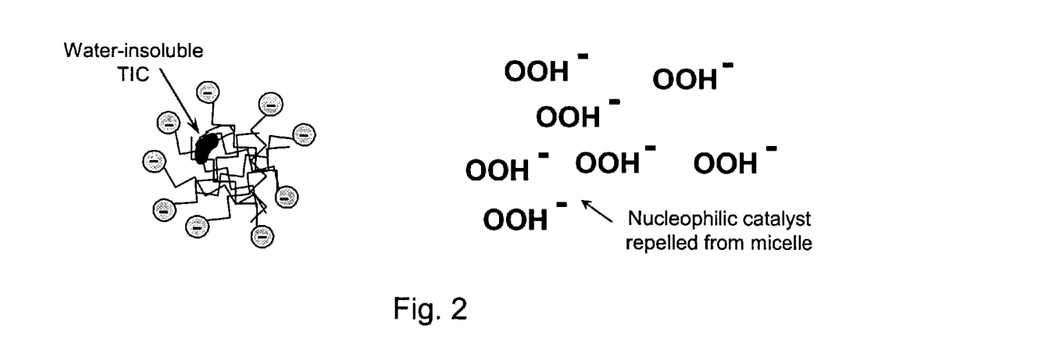
FIG. 2 illustrates where nucleophies are repelled by anionic micelles and do not attach an insoluble TIC within a cationic micelle that is formed from cationic surfactants.

FIG. 2 illustrates where nucleophies are repelled by anionic micelles and do not attach an insoluble TIC within a cationic micelle that is formed from cationic surfactants. In FIG. 2, the formulation is constructed with anionic surfactants, such as those in a typical firefighting foam. Here, the negatively charged micelles repel the nucleophiles that would not neutralize the insoluble TIC that is dissolved in the micelle.

Figure 3:
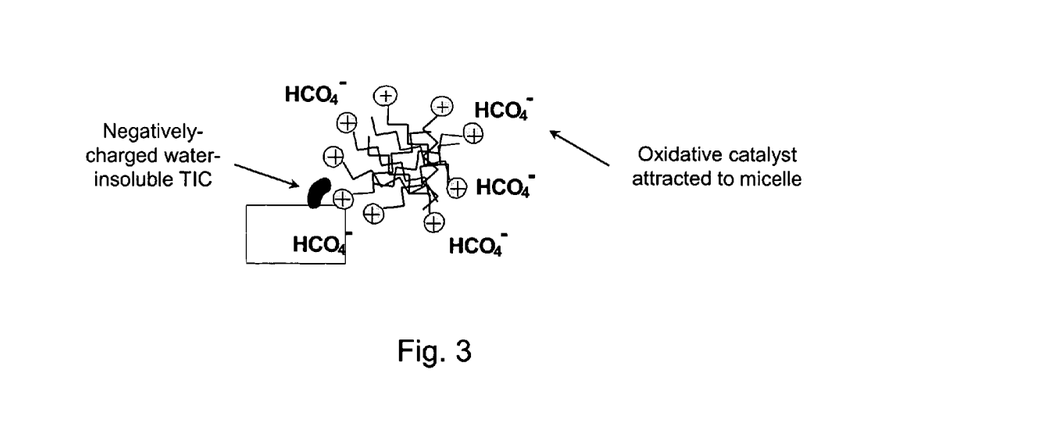
FIG. 3 illustrates oxidative attack of a negatively charged water-soluble TIC within a cationic micelle that is formed from cationic surfactants.

FIG. 3 illustrates oxidative attack of a negatively charged water-soluble TIC within a cationic micelle that is formed from cationic surfactants. In this case, the negatively charged TIC is dissolved in the water phase. Its negative charge attracts it to the cationic micellar environment where it will react with the negatively charged oxidant (which is also attracted to the cationic micelle). This mechanism is termed "inverse phase-transfer catalysis" and, until now, this principle has never been used for an aqueous foam decontamination technology.

A list of TICs was identified that are considered to be potential threats. Data was gathered from DOJ and DOD sources that identify TICs that are a threat based on accessibility, production volumes, and physical and chemical properties. The DOJ, for example, has identified 21 TICs at the highest threat level, 38 TICs at a medium threat level, and 39 TICs at a low threat level. The DOD has developed a threat list which contains 25 high threat TICs. These threat lists includes irritants (e.g., sulfur dioxide and anhydrous ammonia), choking agents (e.g., phosgene, and hydrogen cyanide), organophosphorous pesticides (e.g., malathion and parathion) and volatile organic compounds (e.g., isocyanates). The lists include both gases and liquids.

A review of the fundamental chemistry of the TICs reveals that the majority of the threat list TICs can be neutralized by four reaction mechanisms: 1) chemical oxidation, 2) nucleophilic attack, 3) chemical reduction, and 4) buffering. These reaction mechanisms can potentially neutralize a large number of TICs on the threat lists. For example, 15 out of 21 TICs on the DOJ high threat level list can be neutralized with these reaction mechanisms. In general, there are only two classes of TICs which cannot be decontaminated using these mechanisms; 1) strong acids and bases, which are best neutralized by non-aqueous technologies (such as solid bicarbonate) to avoid violent reactions which may occur when water is added to strong acids or bases; and 2) TICs which contain toxic metals, e.g., mercury, cadmium (which, by definition, cannot be chemically neutralized).

In the present invention, a set of three closely related decontamination formulations (A, B, and C) were developed for each of the reaction mechanisms described above. The chemical oxidation and nucleophilic attack mechanisms were combined into a single formulation; giving a total of three types of reactive formulations. When the formulations are deployed as foams, this gives a method to rapidly deploy the reactive formulations over large areas, which is especially applicable for use by the first responder. Other product deployment forms may be used, as well, including fogs, sprays, washes, gels, creams, powders, aerosols, etc. Table 1 summarizes these three types of closely related reactive formulations and their broad range of capabilities.

TABLE 1

TIC Decontamination Formulations

| | TIC subject to nucleophilic attack/ oxidative attack | TIC subject to reductive attack | TIC subject to neutralization by buffering |
| --- | --- | --- | --- |
| Water-soluble TIC | Formulation A: Oxidation/ Nucleophilic Reaction | Formulation B: Reduction Reaction | Formulation C: Buffering Reaction |
| Insoluble TIC | Formulation A: Oxidation/ Nucleophilic Reaction | Formulation B: Reduction Reaction | Formulation C: Buffering Reaction |

Useful versions of Formulation A (oxidation/nucleophilic attack) comprises the DF-200 decontamination formulations previously developed by Sandia Corporation, and which are the subject of a currently co-pending, commonly-assigned patent application Ser. No. 10/251,569, herein incorporated by reference.

All of the three closely-related TIC decontamination formulations (A, B, and C), according to the present invention, comprise various combinations of the following five Basic Parts:

Part 1 (Aqueous Component);

Part 2 (Oxidant);

Part 3 (Bleaching Activator);

Part 4 (Reductant); and

Part 5 (Acid).

Formulations A, B, and C, according to the present invention, are made from the following combinations of Basic Parts:

Formulation A (Oxidizing/Nucleophilic)=Part 1+Part 2+Part 3;

Formulation B (Reducing)=Part 1+Part 4; and

Formulation C (Buffering)=Part 1+Part 5.

Note that each of these three closely-related decon formulations, A, B, and C, use Part 1 (Aqueous Component) as a common ingredient.

Part 1 (Aqueous Component)

The minimum ingredients for Part 1, according to the present invention, comprises:
- a solubilizing compound, such as a cationic surfactant, a cationic hydrotrope, and/or a fatty alcohol comprising 8–20 carbon atoms;
- a buffering compound; and
- water.

The solubilizing compound serves to effectively render the TIC susceptible to attack, while the buffering compound serves to buffer the formulation, optimize its pH, and provide alkalinity.

The solubilizing compound in Part 1 may comprise a cationic surfactant, for example: quaternary ammonium salts and polymeric quaternary salts. Some examples of suitable quaternary ammonium salts include: cetyltrimethyl ammonium bromide, benzalkonium chloride, benzethonium chloride, cetylpyridinium chloride, alkyldimethylbenzylammonium salt, and tetrabutyl ammonium bromide, or combinations thereof. A preferred cationic surfactant is VARIQUAT 80MC™ (which used to be supplied by WITCO, Inc., but now is supplied by Degussa Goldschmidt). VARIQUAT 80MC™ comprises a mixture of benzyl (C12–C16) alkyldimethylammonium chlorides. A preferred concentration of quaternary ammonium salt may be greater than about 0.1% but no more than about 10%, because at higher concentrations the quaternary ammonium salt becomes significantly toxic to humans and the environment.

The solubilizing compound in Part 1 may comprise a cationic hydrotrope, for example: tetrapentyl ammonium bromide, triacetyl methyl ammonium bromide, and tetrabutyl ammonium bromide, or combinations thereof. A preferred cationic hydrotrope is ADOGEN 477™ (which used to be supplied by WITCO, Inc., but now is supplied by Degussa Goldschmidt). ADOGEN 477™ comprises pentamethyltallow alkyltrimethylenediammonium dichloride.

The solubilizing compound in Part 1 may comprise a fatty alcohol, for example: alcohols having 8–20 carbon atoms per molecule, such as: 1-dodecanol, 1-tridecanol, hexadecanol, and 1-tetradecanol, or combinations thereof.

The solubilizing compound in Part 1 may comprise any combination of the above-mentioned cationic surfactant, cationic hydrotrope, and/or fatty alcohol.

The buffer compound in Part 1 may comprise a carbonate salt, such as: potassium carbonate, potassium bicarbonate, sodium carbonate, sodium bicarbonate, sodium percarbonate ammonium bicarbonate, ammonium hydrogen bicarbonate, lithium bicarbonate, ammonium carbonate, and calcium carbonate, or combinations thereof.

Part 1 may optionally comprise a number of additional ingredients, including: foaming agents, foam stabilizers, solvents, water-soluble polymers, a corrosion-inhibitor, freeze point depressants, sorbent additives, or combinations thereof.

In some foaming versions of Part 1, a cationic water-soluble polymer (e.g., Jaguar 8000™), may be used to increase the bulk viscosity of the solution and to produce a more stable foam. Some examples of suitable water-soluble polymers include: polyvinyl alcohol, guar gum, polydiallyl dimethyl ammonium chloride, polyacrylamide, glycerol, poly(ethylene oxide), poly(ethylene glycol), polyethylene glycol 8000 (e.g., PEG 8000), and Jaguar 8000™ (Guar Gum 2-hydroxypropyl ether) and poly-ethoxylated glycerine, or combinations thereof. Fatty alcohols, i.e., 1-dodecanol, may also be used to increase the surface viscosity of the foam lamellae and to increase foam stability against drainage and bubble collapse. Other foaming agents may also be included in high-foaming formulations, such as: Celquat SD 240c (at about 0.15%) and/or Lumulse POE 12 (at about 4%). Polyethylene glycol polymer (e.g., PEG 8000, MW=8000) may be used for viscosity enhancement. This polymer is used in many cosmetics, and is extremely soluble and stable in water. In addition, it is easier to mix into solution than Jaguar 8000 or a high molecular weight poly(ethylene oxide), since it does not have the tendency to clump.

Glycerol (or glycereth-12, for example) may be optionally used in Part 1 as a viscosity builder, for example, in place of Jaguar 8000, poly (ethylene oxide), or polyethylene glycol. Glycerol (glycerine) is a common ingredient in cosmetics, where it is used a viscosity builder, humectant, and emollient. Use of glycerol or glycereth-12 can serve multiple purposes, including:
- Viscosity builder,
- Humectant (i.e., a substance which moisturizes the skin),
- Solvent to keep 1-dedecanol in solution, and
- Co-solvent to solubilize insoluble chemical agents, such as Sarin or mustard.

A potential drawback to the use of glycerol is that it is solid at a fairly high temperature (below about 10° C.). Therefore, it would preferably be used in controlled temperature conditions (i.e., warm temperature conditions). Alternatively, ethoxylated forms of glycerol [e.g., poly(ethoxylated glycerol)] may be used. These forms of glycerol have a lower freezing point.

Corrosion inhibitors may optionally be added to in Part 1 to reduce its corrosivity. A preferred corrosion inhibitor is N,N-dimethyl ethanolamine. Other corrosion inhibitors, such as triethanolamine, ethanolamine salts of C9, C10, and C12 diacid mixtures, dicyclohexyl amine nitrite, and N,N-dibenzylamine, may also be used. Use of these corrosion inhibitors can serve multiple purposes, including:
- Corrosion inhibitor,
- pH buffer,
- Solvent to keep 1-dodecanol in solution, and
- Co-solvent to solubilize insoluble chemical agents, such as Sarin or mustard.

Part 1 may optionally comprise a freeze point depressant, e.g., proplyene glycol.

Part 1 may optionally comprise one or more solvents, e.g., di(propylene glycol) methyl ether, diethylene glycol monobutyl ether, tripropyleneglycol methyl ether, hexylene glycol, N,N-dimethlyethylamine, isobutanol, and isopropanol, or combinations thereof.

Part 2 (Oxidant)

Use of Part 2 (oxidant) in Formulation A provides one or more oxidizing, negatively-charged nucleophiles, e.g., hydroxyl ions ($OH^-$) and hydroperoxide ions ($OOH^-$) produced when using hydrogen peroxide; and/or hydroperoxycarbonate ions ($HCO_4^-$) produced when hydrogen peroxide is combined with a carbonate salt. Hydroperoxycarbonate ions ($HCO_4^-$) are a much stronger oxidant than hydroxyl ions ($OH^-$) or hydroperoxide ions ($OOH^-$), and are especially effective in reacting with biological toxants.

Some examples of suitable oxidizing compounds (i.e., oxidants) for use in Part 2 include: peroxide compounds, activated peroxide compounds (e.g., hydrogen peroxide+ bicarbonate), hydrogen peroxide, urea hydrogen peroxide, hydroperoxycarbonate, sodium perborate, sodium percarbonate, sodium carbonate perhydrate, sodium peroxysilicate, sodium peroxypyrophosphate, sodium peroxysilicate, sodium peroxysilicatehydrogen, peroxide adducts of pyrophosphates, citrates, sodium sulfate, urea, sodium silicate, peracetic acid, oximates (e.g., butane-2,3-dione, monooximate ion, and benzohydroxamate), alkoxides (e.g., methoxide and ethoxide), aryloxides (e.g., aryl substituted benzenesulfonates), aldehydes (e.g., glutaraldehyde), peroxymonosulfate, Fenton's reagent (a mixture of iron and peroxide), and sodium hypochlorite, or combinations thereof.

Use of these oxidizing compounds in Formulation A can provide a variety of negatively-charged nucleophiles, e.g., hydroxyl ions ($OH^-$) and hydroperoxide ions ($OOH^-$) produced when using hydrogen peroxide; and/or hydroperoxycarbonate ions ($HCO_4^-$) produced when hydrogen peroxide is combined with a carbonate salt. Hydroperoxycarbonate ions ($HCO_4^-$) are a much stronger oxidant than hydroxyl ions ($OH^-$) or hydroperoxide ions ($OOH^-$), and are especially effective in reacting with biological toxants.

When using hydrogen peroxide in some embodiments of the present invention, its concentration may be less than about 10%, because higher concentrations are significantly corrosive, especially in the range of 30–50%.

Part 3 (Bleaching Activator)

Bleaching activators are used in Formulation A for a variety of purposes. Their use can enhance the activity of the oxidant (Part 2), speed up reaction kinetics, improve performance, and reduce or eliminate the need for pH adjustment. Bleaching activators may be compounds with O— or N-bounded acetyl groups or with nitrile groups that react with the strongly nucleophilic hydroperoxy anion ($OOH^-$) to yield peroxygenated species (which are more efficient oxidizers than hydrogen peroxide alone), as illustrated below.

Since the 1950's, a number of different bleaching activators have been used in commercial laundry detergents, as well as other commercial products. The most common activators are tetraacetyl ethylenediamine (TAED), which is primarily used in Europe and Asia; and n-nonanoyloxybenzenesulfonate (NOBS), which is primarily used in the United States; and N-acetyl pentaacetate. NOBS is a proprietary chemical of the Proctor and Gamble Company. In a laundry detergent, hydrogen peroxide is provided in a solid form (usually as sodium perborate, which reacts in water to form the hydroperoxy anion). The addition of a bleaching activator greatly enhances the ability of a laundry detergent to remove stains from clothing.

It should be noted that TAED and NOBS bleaching activators are extremely insoluble in water (e.g., TAED is only 0.1% soluble at 25° C.). To get around this problem in a laundry detergent, the solid TAED or NOBS particles are kept in suspension by the agitating action of the washing machine, where they slowly react with the hydrogen peroxide in the detergent. However, agitating Formulation A in the field presents practical problems; hence, a water-soluble bleaching activator is preferred.

Some examples of suitable water-soluble bleaching activators, according to the present invention, include: short-chained organic compounds that contain an ester bond (e.g., ethylene glycol diacetate), propylene glycol monomethyl ether acetate, methyl acetate, dimethyl glutarate, diethylene glycol monoethyl ether acetate, glycerol acetate (monoacetin), glycerol diacetate (diacetin), glycerol triacetate (triacetin), acetylcholine chloride, 4-cyanobenzoic acid, and propylene glycol diacetate, or combinations thereof. A preferred water-soluble bleaching activator is propylene glycol diacetate (PGDA), which is shown below.

This molecule reacts with hydroperoxy anions ($OOH^-$), giving up the ester bonds to form two peroxygenated molecules.

This water-soluble bleaching activator, propylene glycol diacetate (PGDA), also acts as an organic solvent that is highly effective in solubilizing insoluble organic molecules (e.g., chemical warfare agents, as well as foam stabilizers/boosters (such as 1-dodecanol and Lauramide DEA). Therefore, an added function of this compound is that it may be used to supplement diethylene glycol monobutyl ether (DEGMBE) solvent that may be used in DF-100 and DF-100A formulations, or to supplement the di(propylene glycol) methyl ether solvent that may be used in some DF-200/Formulation A formulations, thereby allowing the propylene glycol diacetate to serve a dual purpose (i.e., solvent and bleaching activator) in Formulation A formulations.

Bleaching activators are generally not stable in water for long periods of time. This is especially true when the aqueous solution is at a high pH (>10). Therefore, for long shelf life, the propylene glycol diacetate (or other bleaching activator) is preferably stored separate from the aqueous solution until use. This is not unlike other products that utilize bleach activators (e.g., laundry detergents), where all the components of the formulation are kept dry and separated until use (note: in the case of laundry detergent, the bleaching activator is encapsulated to prevent it from reacting with the peroxide component until both components are mixed in water).

Another example of a water-soluble bleaching activator is ethylene glycol diacetate, which also works well in Formulation A formulations. However, when ethylene glycol diacetate reacts with hydrogen peroxide it forms ethylene glycol (i.e., anti-freeze), which is a relatively toxic byproduct. Propylene glycol diacetate, on the other hand, does not form this relatively toxic byproduct.

Solid O-acetyl bleaching activators (e.g., acetylcholine chloride, which is often used in eye drop solutions) may be used in place of (liquid) propylene glycol diacetate. The chemical structure of this O-acetyl bleaching activator is shown below.

As can be seen, the molecule contains an O-acetyl group that can activate peroxide, and it is a quaternary compound, which is very compatible with Formulation A. Acetylcholine chloride is also soluble in water, and is very hygroscopic.

Three other O-acetyl bleaching activators, monoacetin (glycerol monoacetate) diacetin (glycerol diacetate), and triacetin (glycerol triacetate) have also been tested for their effectiveness in DF-200 formulations. All of these compounds have also proven to be extremely effective bleaching activators. These compounds are water-soluble liquids.

Experiments have also shown that the peroxide in Formulation A is also effectively activated by a nitrile-containing compound, such as 4-cyanobenzoic acid (which is water-soluble), at a concentration of, for example, 2%, for the neutralization of both chemical agent and biological agent simulants.

Part 4 (Reductant)

Some examples of suitable reducing agents (i.e., reductants) for use in Part 4 of Formulation B include: sodium bisulfite ($NaHSO_3$), ferrous sulfide, sodium sulfide, sodium thioglycollate, sodium thiosulfate, and sodium borohydride, or combinations thereof.

Part 5 (Acid)

Some examples of suitable acids for use in Part 5 of Formulation C include: sodium bisulfate ($NaHSO_4$), citric acid, acetic acid, nitrous acid, hydrocyanic acid, hydrogen sulfide, and phenols, or combinations thereof. Strong acids may also be used, instead of weak acids.

EXAMPLES

Example #1

Concentration Ranges for Parts 1–5

Example #1 illustrates an example of suitable ranges of concentrations (by weight percent) of the various ingredients of Parts 1–5.

Part 1 (Aqueous Component):
   0.1–10% Cationic Surfactant
   0–10% Cationic Hydrotrope
   1–10% Buffer/Alkalinity
   0–1% Foam Stabilizer
   0–30% Solvent
   0–40% Antifreeze
   0–8% Water-Soluble Polymer
   0–1% Corrosion Inhibitor
   Water (balance)
Part 2 (Oxidant):
   1–30% Urea Hydrogen Peroxide
Part 3 (Bleaching Activator):
   1–10% Propylene Glycol Diacetate or Glycerol Diacetate
Part 4 (Reductant):
   0.1–5% Sodium Bisulfite
Part 5 (Acid):
   0.1–2% Sodium Bisulfate or Citric Acid The lower range for the optional ingredients, such as the foam stabilizer, solvent, antifreeze, water-soluble polymer, and corrosion inhibitor are set at zero. Some of these ingredients are included for foam stability and may be removed if it is desired to deploy these reactive chemistries as a liquid spray, bath, fog or mist, etc.

Next, specific examples of formulations are presented for each type (A, B, C) of closely related decontamination formulation, according to the present invention.

Example #2

Formulation A

In this example, Part 2 of Formulation A is stored as a solid component (i.e., powdered form). Parts 1, 2 and 3 can be stored separately, in a kit configuration. The final made-up solution makes about 1 liter of activated solution ready for use.

Part 1 (Liquid Formulation Component):
   20 g Variquat 80MC (Cationic Surfactant)
   10 g Adogen 477 (Cationic Hydrotrope)
   4 g 1-Dodecanol (Foam Stabilizer)
   90 g Propylene Glycol (Antifreeze)
   7.5 g Isobutanol (Solvent)
   50 g Potassium Carbonate (Buffer/Alkalinity)
   2 g Potassium Bicarbonate (Buffer/Alkalinity)
   1.5 g Celquat SC-240C (Polymer)
   750 g Water
Part 2 (Solid Oxidant Component):
   97 g Urea Hydrogen Peroxide
Part 3 (Liquid Bleaching Activator):
   20 g Glycerol Diacetate
Note: The pH of the final formulation should be between 9.6 and 9.8. To mix this formulation, use the following procedure: mix Part 2 into Part 1. After dissolution of the urea hydrogen peroxide, add Part 3 to Parts 1+2. Use within about 8 hours.

Example #3

Formulation A

In this example, Part 2 of Formulation A is stored as a liquid component (i.e., aqueous solution). Parts 1, 2 and 3 can be stored separately, in a kit configuration. The final made-up solution makes about 1 liter of activated solution ready for use.

Part 1 (Liquid Formulation Component):
   20 g Variquat 80MC (Cationic Surfactant)
   10 g Adogen 477 (Cationic Hydrotrope)
   4 g 1-Dodecanol (Foam Stabilizer)
   90 g Propylene Glycol (Antifreeze)
   7.5 g Isobutanol (Solvent)
   50 g Potassium Carbonate (Buffer/Alkalinity)
   2 g Potassium Bicarbonate (Buffer/Alkalinity)
   1.5 g Celquat SC-240C (Polymer)
   315 g Water
Part 2 (Solid Oxidant Component):
   433 g of 8% Hydrogen Peroxide solution
Part 3 (Liquid Bleaching Activator):
   20 g Glycerol Diacetate
Note: The pH of the final formulation should be between 9.6 and 9.8. To mix this formulation, use the following procedure: mix Part 1 and Part 2 together. Then, add Part 3 to Parts 1+2. Use within about 8 hours.

Example #4

Formulation B

In this example, Part 4 of, Formulation B is stored as a solid component (i.e., powdered form). Parts 1 and 4 can be stored separately, in a kit configuration. The final made-up solution makes about 1 liter of activated solution ready for use.

Part 1 (Liquid Formulation Component):
   20 g Variquat 80MC (Cationic Surfactant)
   10 g Adogen 477 (Cationic Hydrotrope)
   4 g 1-Dodecanol (Foam Stabilizer)
   20 g Poly(ethylene glycol) 8000 (Polymer)
   8 g Diethylene Glycol Monobutyl Ether (Solvent)
   5 g Isobutanol (Solvent)

50 g Potassium Bicarbonate (Buffer/Alkalinity)
24.5 g Potassium Hydroxide (Buffer/Alkalinity)
928 g Water
   (note: The pH of Part 1 should be approximately 10.5)
Part 4 (Solid Reducing Agent):
   20 g Sodium Bisulfite
Note: The pH of the final formulation should be between 9.6 and 9.8. To mix this formulation, use the following procedure: mix Part 4 into Part 1. Use within about 8 hours.

Example #5

Formulation B

In this example, Part 4 of Formulation B is stored as a liquid component (i.e., aqueous solution). Parts 1 and 4 can be stored separately, in a kit configuration. The final made-up solution makes about 1 liter of activated solution ready for use.
   Part 1 (Liquid Formulation Component):
      20 g Variquat 80MC (Cationic Surfactant)
      10 g Adogen 477 (Cationic Hydrotrope)
      4 g 1-Dodecanol (Foam Stabilizer)
      90 g Propylene Glycol (Antifreeze)
      1.5 g Celquat SC-240C (Polymer)
      7.5 g Isobutanol (Solvent)
      50 g Potassium Carbonate (Buffer/Alkalinity)
      2 g Potassium Bicarbonate (Buffer/Alkalinity)
      315 g Water
   Part 4 (Liquid Reducing Agent):
      450 g of 4% Sodium Bisulfite solution
Note: The pH of the final formulation should be between 9.6 and 9.8. To mix this formulation, use the following procedure: mix Part 4 into Part 1. Use within about 8 hours.

Example #6

Formulation C

In this example, Part 5 of Formulation C is stored as a solid component (i.e., powdered form). Parts 1 and 5 may be stored separately, in a kit configuration; or they may be pre-mixed and stored as a made-up, activated solution. The final made-up solution makes about 1 liter of activated solution ready for use.
   Part 1 (Liquid Formulation Component):
      20 g Variquat 80MC (Cationic Surfactant)
      10 g Adogen 477 (Cationic Hydrotrope)
      4 g 1-Dodecanol (Foam Stabilizer)
      55 g Glycereth-12 (Viscosity Builder)
      8 g Diethylene Glycol Monobutyl Ether (Solvent)
      5 g Isobutanol (Solvent)
      50 g Potassium Bicarbonate (Buffer/Alkalinity)
      24.5 g Potassium Hydroxide (Buffer/Alkalinity)
      928 g Water
      (note: The pH of Part 1 should be approximately 10.5)
   Part 5 (Solid Acid):
      28 g Sodium Bisulfate
Note: The pH of the final formulation should be between 9.6 and 9.8. To mix this formulation, use the following procedure: mix Part 5 into Part 1. Use indefinitely.

Example #7

Formulation C

In this example, Part 5 of Formulation C is stored as a liquid component. Parts 1 and 5 may be stored separately, in a kit configuration; or they may be pre-mixed and stored as a made-up, activated solution. The final made-up solution makes about 1 liter of activated solution ready for use.
   Part 1 (Liquid Formulation Component):
      20 g Variquat 80MC (Cationic Surfactant)
      10 g Adogen 477 (Cationic Hydrotrope)
      4 g 1-Dodecanol (Foam Stabilizer)
      7.5 g Isobutanol (Solvent)
      90 g Propylene Glycol (Antifreeze)
      50 g Potassium Carbonate (Buffer/Alkalinity)
      2 g Potassium Bicarbonate (Buffer/Alkalinity)
      1.5 g Celquat SC-240C (Polymer)
      315 g Water
   Part 5 (Liquid Acid):
      450 g of 5.5% Sodium Bisulfate solution
Note: The pH of the final formulation should be between 9.6 and 9.8. To mix this formulation, use the following procedure: mix Part 5 into Part 1. Use indefinitely.

Experimental Results

Several TICs were selected so that the decontamination effectiveness of each reactive formulation (A, B, and C) could be verified; and so that both liquid and gas decontamination could be evaluated. A summary of the results of TICs tested to date is shown in Table 2. Note that the results for malathion, butyl isocyanate, capsaicin, sodium cyanide, and carbon disulfide were obtained by analyzing for the unreacted chemical in foam solution, while the results for phosgene, chlorine, hydrogen cyanide, and ammonia were obtained by analyzing for the chemical in the headspace above a foam solution. All of the gas-phase testing was conducted at the Southwest Research Institute (SWRI) in San Antonio, Tex.

TABLE 2

Summary of TIC neutralization testing results (Challenge Ratio: 200:1)

| | Decon | % Decontaminated | | |
|---|---|---|---|---|
| TIC | Form. | 1 minute | 15 minutes | 60 minutes |
| Malathion (liquid) | A | 89 | 95 | Below Detection |
| Hydrogen | A | >99 | >99 | >99 |
| Sodium Cyanide | A | 93 | 98 | >99 |
| Butyl Isocyanate | A | 99 | Below Detection | Below Detection |
| Carbon Disulfide | A | >99 | >99 | Below Detection |
| Phosgene (gas) | A | 98 | >99 | >99 |
| Capsaicin (liquid) | A | Below Detection | Below Detection | Below Detection |
| Chlorine (gas) | B | >99 | >99 | >99 |
| Anhydrous | C | >99 | >99 | >99 |

As can be readily seen from the data, decon formulations A, B, and C perform very well against the TICs that were tested.

Some of the TICs that also would be expected to be neutralized by decontamination formulations A, B, and C, but have not yet been tested, are shown in Table 3.

TABLE 3

Additional TICs that may be neutralized by formulations A, B, and C.

| TIC | Decon Form. | DOJ Threat List Ranking |
|---|---|---|
| Hydrogen Sulfide (gas) | A | High |
| Sulfur Dioxide (gas) | A | High |
| Formaldehyde (liquid and gas) | A | High |
| Ethylene Oxide (gas) | A | High |
| Methyl Bromide (gas) | A | Medium |
| Boron Trichloride (liquid) | A | High |
| Fluorine (gas) | B | High |
| Tetraethyl Pyrophosphate (liquid) | A | Low |
| Phosphorous Trichloride (liquid) | A | High |
| Arsine (gas) | A | High |
| Tungsten Hexaflouride (gas) | A | High |

Optional Sorbent Material for Drying Out Liquid Ingredients

Optionally, a sorbent additive may used to "dry out" one or more liquid ingredients of the decontamination formulations in the present invention. A goal of "drying out" as many liquid ingredients as possible is to produce a dry, free-flowing, granulated powder or powders that can be placed in protective packaging (e.g., with a desiccant), have an extended shelf life, be more convenient to handle and mix in the field (as compared to handling and mixing a liquid), preferably not leave a residue, and have a reduced storage weight. In this way, the sorbent material acts as a drying agent to produce a granulated form.

In the present decontamination Formulations A, B, and C some of the ingredients must be stored separately in order to prevent premature chemical reaction before use. For example, hydrogen peroxide must be stored separately from the other ingredients prior to use, due to its high reactivity. This can be accomplished by packaging the formulation as a multi-part kit system (e.g., 2-part, 3-part kits). For example, a two-part kit system can be used, comprising a relatively inert component (Part 1), and active components (Parts 2, 3, 4, 5)) that comprises the reactive solution. The bulk of the make-up water may be "pre-packaged" in one of the two containers, which allows for rapid deployment of the decontamination solution, without the need for providing extra water in the field. Alternatively, the make-up water (including seawater) can be provided in the field, which greatly reduces the weight of the pre-packaged kit components, making it easier to ship and store.

Ideally, all of the various components/parts of a multi-part kit system would be in the form of a dry, granulated, freely flowing powder that can be easily mixed with water that has been provided in the field. Such a dry powder material could be packaged with a desiccant for providing superior moisture protection, thereby extending the shelf life. Fortunately, one of the preferred reactive compounds, hydrogen peroxide, is available in a variety solid, granulated, water-soluble forms, including: urea hydrogen peroxide, sodium perborate, and sodium percarbonate. Preferably, the made-up decontamination solution ideally should be used within 8–24 hours after being made-up in order to have the maximum neutralization effect.

Most of the other ingredients that are used in Formulations A, B and C (e.g., cationic surfactants, cationic hydrotropes, solvents, peroxide activators, buffers, foaming agents, foam stabilizers, freeze point depressants, corrosion inhibitors, etc.) are typically available in liquid form. In some applications, suitable sorbent materials can be used to "dry-out" the liquid ingredients and convert them into a dry, granulated, freely-flowing powder that is more easily handled and mixed in the field, without affecting the neutralization performance of the made-up (i.e., "activated") decontamination solution.

A granulated, all-dry decontamination formulation would have the following properties, compared to an all-liquid or part-liquid plus part-granulated formulations:

Significant reduction in the weight of the formulation required to be shipped and stored;

Saltwater or other low quality water can be used as the make-up water;

The formulation can be stored in low temperature locations; and

Increased shelf life due to removal of water from the ingredients.

The process of "drying out" liquid ingredients is not really an evaporation process as it is commonly understood. Rather, the sorbent additive absorbs and/or adsorbs the liquid to produce a powdered, free-flowing, granulated product that is easier to handle. Preferably, the sorbent additive should not contain any water, since some of the liquid ingredients will hydrolyze or degrade in the presence of moisture. Also, the sorbent additive preferably should be water-soluble, so that it can be rapidly dissolved and mixed, and it should leave no residue.

Alternatively, a water-insoluble sorbent additive may be used (e.g., amorphous silica), depending on the application, if the presence of insoluble particles in the formulation is acceptable or desirable. For example, insoluble sorbent particles may be used to thicken and increase the viscosity of the made-up decontamination solution, effectively creating a gel that has increased "hang-time" on vertical surfaces. Alternatively, insoluble sorbent additives may be used as a cleaning solution and/or where an abrasive effect is desired. For some methods of application the presence of a sludge at the bottom of a container may not be a problem. However, the presence of insoluble sorbent particles in the made-up decontamination formulation may damage a pump mechanism, clog a spray nozzle, or leave an undesirable residue.

Sorbent additives are preferably finely ground to a small particle size so that a large effective surface area can be provided for adsorbing/absorbing the liquid ingredient(s). The sorbent additive is preferably chemically compatible with the entire family of closely related decontamination formulations, and should not cause degradation of the decontamination solution's effectiveness, or degrade the foaming properties (if a foaming version is used). The sorbent additive may be selected from elements/ingredients already found in the decontamination formulation. The sorbent additive may comprise a single compound, or a blend of different compounds. For example, polyethylene glycol (e.g., PEG 8000 or Carbowax 8000) is used as a viscosity builder in some versions of Formulations A, B, and C to enhance foaming properties. Since PEG 8000 is typically provided as a fine powder and is essentially anhydrous, then it can also serve as some (or all) of the sorbent additive for "drying out" liquid ingredients.

Some examples of suitable compounds that may be used as the sorbent additive, either alone or in various combinations, according to the present invention, are listed in Table 4.

TABLE 4

Sorbent Additives

Sodium carbonate
Sodium bicarbonate
Potassium carbonate
Potassium bicarbonate
Calcium carbonate
Potassium silicate
Precipitated silicates
Percarbonates
Amorphous silica (fumed silica)
Sodium Citrate
Dendritic Salt (e.g., sea salt)
Citric Acid
Polyethylene Glycols, (e.g., PEG 8000)
Urea
Polyols (e.g., Sorbitol, Mannitol)

Some examples of suitable polyols that may be used as a sorbent additive are listed in Table 5.

TABLE 5

Polyol Sorbent Additives

Sorbitol,
Mannitol,
Hydrogenated Starch Hydrolysates (HSH),
Maltitol,
Zylitol,
Lactitol Monohydrate,
Anhydrous Isomalt,
Erythritol, and
Polydextrose.

The polyols listed above are sugar-free sweeteners. They are carbohydrates, but they are not sugars. Chemically, polyols are considered polyhydric alcohols or "sugar alcohols" because part of the structure resembles sugar and part is similar to alcohols. However, these sugar-free sweeteners are neither sugars nor alcohols, as those words are commonly used. They are derived from carbohydrates whose carbonyl group (e.g., aldehyde or ketone, reducing sugar) has been reduced to a primary or secondary hydroxyl group.

The most widely used polyols in the food industry are sorbitol, mannitol, and malitol. Sorbitol is derived from glucose; mannitol from fructose; and malitol from high maltose corn syrup. Sorbogem™ and Mannogem™ are product names for sorbitol and mannitol sold by SPI Polyols, Inc., which are available in a wide range of particle size, down to fine sizes (i.e., Sorbogem Fines™).

Sorbitol is a hexahydric alcohol ($C_6H_{14}O_6$) corresponding to glucose, and has a molecular weight of 182.2. It occurs naturally, and can be produced by the hydrogenation of glucose syrup in the presence of Raney Nickel Catalyst. Some synonyms for sorbitol include: cholaxine, clucitol, diakarmon, gulitol, I-gulitol, karion, nivitin, sionit, sorbicolan, sorbite, d-sorbitol, sorbo, sorbol, sorbostyl, sorvilande. Sorbitol has a CAS No. 50-70-4 and an EC No. 200-061-5.

Alternatively, the sorbent additive may be selected to be a "G.R.A.S." material, meaning that it is Generally Accepted As Safe to be used in this and other applications.

Alternatively, the sorbent additive may comprise amorphous silica (i.e., fumed silica). Amorphous silica, which is water-insoluble, is commercially available from the Cabot Corporation under the trade name CAB-O-SIL® in a wide variety of particle sizes, surface areas, bulk densities, and pour densities. CAB-O-SIL® powders are untreated, high-purity, amorphous fumed silicas manufactured by high temperature hydrolysis of chlorosilanes in a hydrogen/oxygen flame. They have extremely small particle sizes, enormous surface areas (from 130–380 $m^2/g$), and can form three-dimensional branched chain aggregates with a length of approximately 0.2–0.3 microns. Further agglomeration takes place during manufacturing to yield a fine, white fluffy powder with an agglomerate size of less than about 44 microns (325 U.S. Mesh).

When amorphous silica is used as a sorbent additive in our decontamination formulations, the dispersed amorphous silica can create a gel, which helps to increase the contact time. Amorphous silica is chemically un-reactive in our formulations, and, thus, does not change its performance against chemical and biological agents when used at relatively low concentrations.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

What is claimed is:

1. An aqueous decontamination formulation for neutralizing toxic industrial chemicals, said formulation comprising a mixture of a first part and a second part; wherein:
   Part 1 comprises a mixture of:
      one or more solubilizing compounds selected from the group consisting of a cationic surfactant, a cationic hydrotrope, and a fatty alcohol comprising 8–20 carbon atoms;
      a buffering compound; and
      water; and
   Part 2 comprises a reducing compound or an acid;
      wherein the reducing compound is selected from the group consisting of sodium bisulfite ($NaHSO_3$), ferrous sulfide, sodium sulfide, sodium thioglycollate, sodium borohydride, and combinations thereof; and
      wherein the acid is selected from the group consisting of sodium bisulfate ($NaHSO_4$), acetic acid, nitrous acid, hydrocyanic acid, hydrogen sulfide, phenols, and combinations thereof;
   wherein the final pH of the aqueous decontamination formulation is between approximately 9.6 and approximately 9.8.

2. The formulation of claim 1, wherein said solubilizing compound in Part 1 comprises a cationic surfactant comprising one or more quaternary ammonium salts selected from the group consisting of cetyltrimethyl ammonium bromide, benzalkonium chloride, benzethonium chloride, cetylpyridinium chloride, alkyldimethylbenzylammonium salt, tetrabutyl ammonium bromide, polymeric quaternary compounds, and benzyl (C12–C16) alkyldimethylammonium chlorides.

3. The formulation of claim 2, wherein the concentration of said cationic surfactant is between approximately 0.1 wt % and approximately 10 wt % of the made-up aqueous decontamination formulation.

4. The formulation of claim 1, wherein said solubilizing compound in Part 1 comprises a cationic hydrotrope comprising one or more compounds selected from the group consisting of tetrapentyl ammonium bromide, triacetyl methyl ammonium bromide, tetrabutyl ammonium bromide, and pentamethyltallow alkyltrimethylenediammonium dichloride.

5. The formulation of claim 1, wherein said solubilizing compound in Part 1 comprises one or more fatty alcohols selected from the group consisting of 1-dodecanol, 1-tridecanol, hexadecanol, and 1-tetradecanol.

6. The formulation of claim 1, wherein said buffering compound in Part 1 comprises one or more carbonate or bicarbonate salts selected from the group consisting of potassium carbonate, potassium bicarbonate, sodium carbonate, sodium bicarbonate, sodium percarbonate ammonium bicarbonate, ammonium hydrogen bicarbonate, lithium bicarbonate, ammonium carbonate, and calcium carbonate, or combinations thereof.

7. The formulation of claim 1, wherein Part 1 further comprises one or more optional ingredients selected from the group consisting of foaming agents, foam stabilizers, solvents, water-soluble polymers, corrosion-inhibitors, freeze point depressants, and sorbent additives.

8. The formulation of claim 7, wherein Part 1 further comprises one or more water-soluble polymers selected from the group consisting of polyvinyl alcohol, guar gum, polydiallyl dimethyl ammonium chloride, polyacrylamide, glycerol, glycereth-12, poly(ethylene oxide), poly(ethylene glycol), polyethylene glycol 8000, guar gum 2-hydroxypropyl ether, poly-ethoxylated glycerine.

9. The formulation of claim 7, wherein Part 1 further comprises one or more solvents selected from the group consisting of di(propylene glycol) methyl ether, diethylene glycol monobutyl ether, tripropyleneglycol methyl ether, hexylene glycol, N,N-dimethlyethylamine, isobutanol, and isopropanol.

10. The formulation of claim 7, wherein Part 1 further comprises one or more corrosion inhibitors selected from the group consisting of N,N-dimethyl ethanolamine, triethanolamine, ethanolamine salts of C9, C10, and C12 diacid mixtures, dicyclohexyl amine nitrite, and N,N-dibenzylamine.

11. The formulation of claim 7, wherein Part 1 further comprises a freeze-point depressant comprising proplyene glycol.

12. The formulation of claim 7, wherein Part 1 further comprises a sorbent additive comprising one or more compounds selected from the group consisting of sodium carbonate, sodium bicarbonate, potassium carbonate, potassium bicarbonate, calcium carbonate, potassium silicate, precipitated silicates, percarbonates, amorphous silica, fumed silica, sodium citrate, dendritic salt (sea salt), citric acid, polyethylene glycol, PEG 8000, urea, and polyols.

13. The formulation of claim 12, wherein the sorbent additive comprises one or more polyol compounds selected from the group consisting of sorbitol, mannitol, hydrogenated starch hydrolysates (HSH), maltitol, zylitol, lactitol monohydrate, anhydrous isomalt, erythritol, and polydextrose.

14. The formulation of claim 1, wherein:
Part 1 comprises:
 0.1–10% Cationic Surfactant;
 0–10% Cationic Hydrotrope;
 1–10% Buffer;
 0–1% Foam Stabilizer;
 0–30% Solvent;
 0–40% Antifreeze;
 0–8% Water-Soluble Polymer;
 0–1% Corrosion Inhibitor; and
 Water (balance); and
Part 2 comprises:
 0.1–5% Reducing compound or 0.1–2% Acid.

15. The formulation of claim 14, wherein:
said cationic surfactant comprises benzalkonium chloride;
said cationic hydrotrope comprises pentamethyltallow alkyltrimethylenediammonium dichloride;
said buffer comprises potassium carbonate and potassium bicarbonate;
said foam stabilizer comprises 1-dodecanol;
said solvent comprises isobutanol and diethylene glycol monobutyl ether;
said reducing compound comprises sodium bisulfite;
said acid comprises sodium bisulfate;
said water-soluble polymer comprises polyethylene glycol; and
said freeze-point depressant comprises propylene glycol.

* * * * *